(12) United States Patent
Raghunathan

(10) Patent No.: US 8,904,138 B2
(45) Date of Patent: Dec. 2, 2014

(54) GLOBAL DISTRIBUTED MEMORY RESHAPE OPERATIONS ON RANGE-PARTITIONED ARRAYS

(75) Inventor: Sudarshan Raghunathan, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 13/247,802

(22) Filed: Sep. 28, 2011

(65) Prior Publication Data

US 2013/0080698 A1     Mar. 28, 2013

(51) Int. Cl.
*G06F 12/00* (2006.01)
*G06F 3/06* (2006.01)

(52) U.S. Cl.
CPC ............. *G06F 3/061* (2013.01); *G06F 3/067* (2013.01); *G06F 3/0661* (2013.01)
USPC .......................................... 711/165; 711/156

(58) Field of Classification Search
USPC .......................................... 711/114, 165, 156
See application file for complete search history.

(56) References Cited

U.S. PATENT DOCUMENTS 6,035,373 A      3/2000  Iwata
2009/0006746 A1 *  1/2009  Sharma et al. ................ 711/114

OTHER PUBLICATIONS

Hyun-Gyoo Yook, Mi-Soon Koo, Myong-Soon Park, Tae-Guen Kim, A Distribution Format for Communication-Free Reshape in Distributed Memory Computers—Retrieved Date: Jul. 20, 2011, Proceedings of the 1997 International Conference on Parallel and Distributed Systems (ICPADS '97),http://citeseerx.ist.psu.edu/viewdoc/download?doi=10.1.1.51.3793&rep=rep1&type=pdf.
Peng Zhao, Shimin Cui, Yaoqing Gao, Raul Silvera, Jose Nelson Amaral, Forma: A Framework for Safe Automatic Array Reshaping—Published Date: Nov. 2007##, Journal ACM Transactions on Programming Languages and Systems (TOPLAS), vol. 30 Issue 1, http://webdocs.cs.ualberta.ca/~amaral/courses/605/papers/ZhaoEtAl05.pdf.
Krishna V. Palem, Rodric M. Rabbah, Vincent J. Mooney III, Pinar Korkmaz, Kiran Puttaswamy, Design Space Optimization of Embedded Memory Systems via Data Remapping—Published Date: Jul. 2002##, Proceedings of the joint conference on Languages, compilers and tools for embedded systems: software and compilers for embedded systems (LCTES/SCOPES '02), http://citeseerx.ist.psu.edu/viewdoc/download?doi=10.1.1.19.7949&rep=rep1&type=pdf.
Yutao Zhong, Maksim Orlovich, Xipeng Shen, and Chen Ding, Array Regrouping and Structure Splitting Using Whole-Program Reference Affinity—Published Date: Jun. 9-11, 2004, PLDI'04, http://citeseerx.ist.psu.edu/viewdoc/download?doi=10.1.1.75.570&rep=rep1&type=pdf.

(Continued)

*Primary Examiner* — Kalpit Parikh
(74) *Attorney, Agent, or Firm* — Kevin Sullivan; David Andrews; Micky Minhas

(57) ABSTRACT

Embodiments are directed to reshaping a partitioned data array. In an embodiment, a computer system identifies a block length parameter that describes the number of data blocks in the range-partitioned flattened representation of the array that appear consecutively in each locale. The computer system then identifies a stride parameter that describes the amount of separation between data blocks in the range-partitioned flattened representation of the array that appear consecutively in a plurality of locales. Based on the identified block length parameter and the stride parameter, the computer system determines which of the data blocks on the plurality of locales are to be sent to other locales to produce a local version of the reshaped array. The computer system then receives data blocks from the different locales in the distributed system and reconstructs the array based on the received blocks to create a local version of the reshaped array.

20 Claims, 4 Drawing Sheets

(56) References Cited

OTHER PUBLICATIONS

Young Won Lim, Bhat, P.B., Prasanna, V.K., Efficient algorithms for block-cyclic redistribution of arrays—Published Date: Dec. 23-26, 1996, Proceedings: Eighth IEEE Symposium on Parallel and Distributed Processing, 1996, http://ieeexplore.ieee.org/stamp/stamp.jsp?tp=&arnumber=570319.

Gupta, S. K. S., Kaushik, S. D., Mufti, S., Sharma, S., Huang, C.-H., Sadayappan, P., On Compiling Array Expressions for Efficient Execution on Distributed-Memory Machines—Published Date: Aug. 16-20, 1993, Proceedings of the International Conference on Parallel Processing (ICPP'93), http://ieeexplore.ieee.org/stamp/stamp.jsp?tp=&arnumber=4134228.

M.F.P. O'Boyle, P.M.W. Knijnenburg, Integrating Loop and Data Transformations for Global Optimisation—Published Date: Oct. 12-18, 1998, International Conference on Parallel Architectures and Compilation Techniques, 1998, http://ieeexplore.ieee.org/stamp/stamp.jsp?tp=&arnumber=727131.

Shankar Ramaswamy, Prithviraj Banerjee, Automatic Generation of Efficient Array Redistribution Routines for Distributed Memory Multicomputers (1995), http://citeseerx.ist.psu.edu/icons/pdf.gif;jsessionid=F2940F441CC73028C056EAD2A3A155F1.

Loic Prylli, Bernard Tourancheau, Block Cyclic Array Redistribution (1995)—Published Date: Oct. 1995, http://citeseerx.ist.psu.edu/icons/pdf.gif;jsessionid=35309CC91411A86E72D22247CB88D34C.

Loic Prylli, Bernard Tourancheau, Fast runtime block cyclic data redistribution on multiprocessors, http://citeseerx.ist.psu.edu/viewdoc/download?doi=10.1.1.52.8870&rep=rep1&type=pdf.

* cited by examiner

GLOBAL DISTRIBUTED MEMORY RESHAPE OPERATIONS ON RANGE-PARTITIONED ARRAYS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to work with and perform operations on large amounts of data. For instance, software applications may be designed to perform computational operations on large data arrays. These arrays may include more information than can fit in the memory of a single computer system. In such cases, the arrays are partitioned and stored on different computer systems. When operations are performed on these distributed arrays, data from a portion of the array stored on one computer system is often needed on another computer system that has a different portion of the distributed array. As such, data is frequently transferred between the different computer systems that store the different portions of the distributed arrays.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein are directed to reshaping an array from a range-partitioned flattened representation to a local, reshaped representation of the array, where different portions of the array are stored in different locales of a distributed system. In one embodiment, a computer system identifies a block length parameter that describes the number of data blocks in the range-partitioned flattened representation of the array that appear consecutively in each locale. The computer system then identifies a stride parameter that describes the amount of separation between data blocks in the range-partitioned flattened representation of the array that appear consecutively in a plurality of locales. Based on the identified block length parameter and the stride parameter, the computer system determines which of the data blocks on the plurality of locales are to be sent to other locales to produce a local version of the reshaped array. The computer system then initiates the data block transfer between the data blocks of the various locales, receives data blocks from the different locales in the distributed system and reconstructs the array based on the received blocks to create a local version of the reshaped array.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
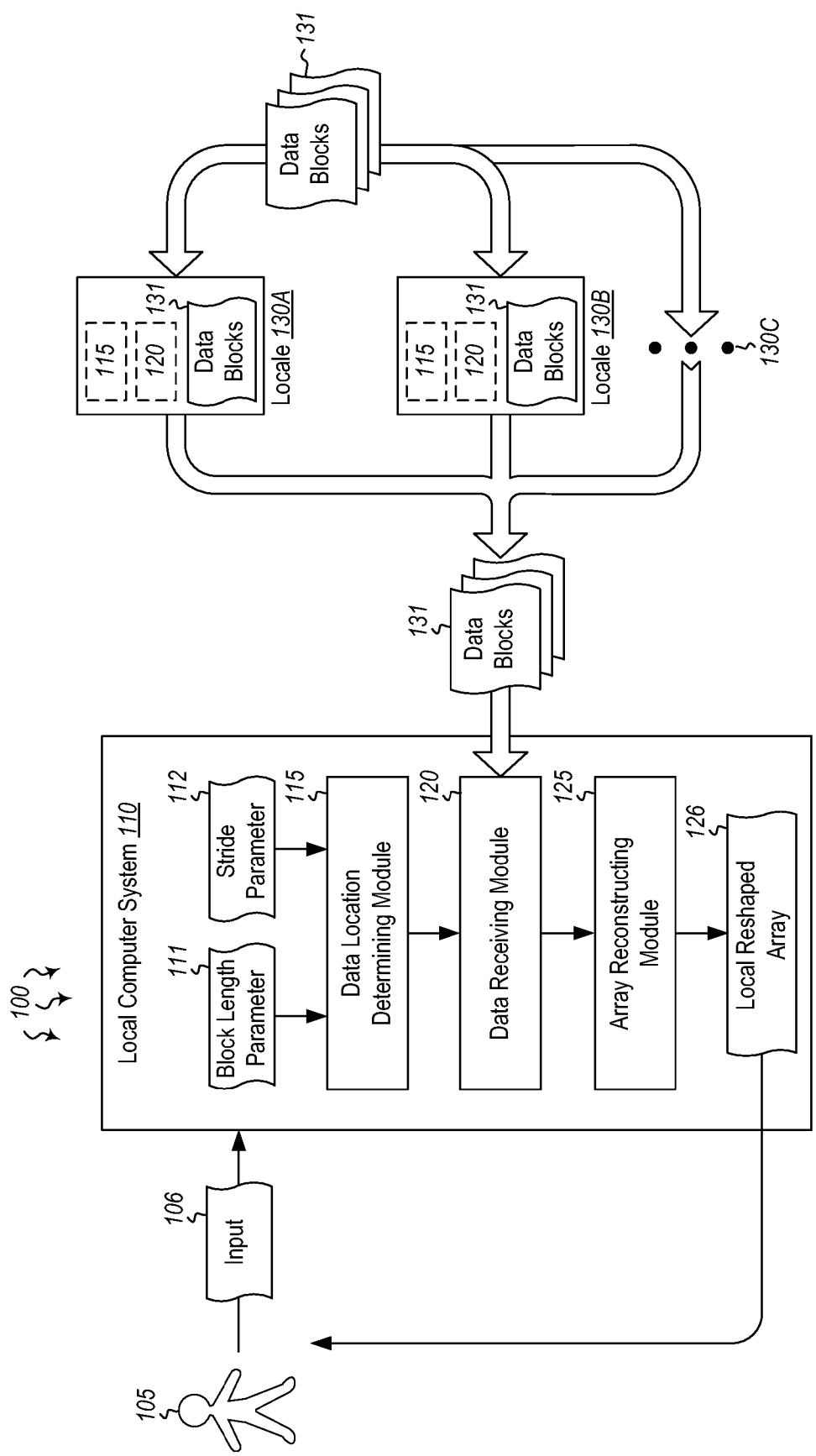
FIG. 1 illustrates a computer architecture in which embodiments of the present invention may operate including reshaping an array from a range-partitioned flattened representation to a local, reshaped representation of the array.

Embodiments described herein are directed to reshaping an array from a range-partitioned flattened representation to a local, reshaped representation of the array, where different portions of the array are stored in different locales of a distributed system. In one embodiment, a computer system identifies a block length parameter that describes the number of data blocks in the range-partitioned flattened representation of the array that appear consecutively in each locale. The computer system then identifies a stride parameter that describes the amount of separation between data blocks in the range-partitioned flattened representation of the array that appear consecutively in a plurality of locales. Based on the identified block length parameter and the stride parameter, the computer system(s) (at each locale) determine(s) which of the data blocks on the plurality of locales are to be sent to other locales to produce a local version of the reshaped array. The computer system then initiates the data block transfer between the data blocks of the various locales, receives data blocks from the different locales in the distributed system and reconstructs the array based on the received blocks to create a local version of the reshaped array.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes local computer system 110, as well as locales 130A, 130B and other locales represented by ellipses 130C. The local computer system may be any type of computer system including a distributed computing system (e.g. a cloud computing system). The locales may be any type of processing system including a processor, processor core, processor thread or other processing mechanism in conjunction with some type of memory. The locales may be configured to communicate with each other and with the local computer system using a wired or wireless network. The various locales may store different portions of a distributed data array. The array may be an array of one or more dimensions, and may include data blocks stored over multiple different locales.

As will be described herein, a global distributed-memory reshape may be implemented to reshape data in an array. The reshape may apply to any distributed array with an arbitrary number of dimensions that is partitioned among P locales (e.g. locales 130A-C) such that each locale stores a potentially uneven portion of the array along one of its dimensions. Typically, the most computationally expensive step in a global reshape operation is computing the data to be sent from locale P to locale P'. Methods described herein perform this computation, at least in some embodiments, by exploiting the cache behavior on each locale.

In some cases, high-level, all-to-all communication primitives may be used to efficiently send portions of distributed arrays between locales in a deadlock-free manner. This avoids computationally expensive scheduling steps. Reshaping a range-partitioned distributed array into another range-partitioned distributed array may be performed by redistributing a one-dimensional vector distributed in a block-cyclic manner.

One embodiment will be outlined here, and explained further below. The embodiment may include execution of a method with multiple steps: 1) provide two range-partitioned arrays A and B that have the same number of elements globally, but are of different shapes and distributions. 2) On each locale P, the method creates a representation of the block size (i.e. length parameter 111) and skip value (i.e. stride parameter 112) for the pieces of A on P and B on P' for every other locale P', including itself. The method then computes the intersection of the line segments that constitute the elements of A on P that are to be sent to constitute the elements of B on P' (e.g. referred to herein as an "intersection set". 3) Similarly, on each locale, the algorithm computes the elements that locale P' receives from locale P essentially by re-performing step 2 while switching P and P'. 4) Each locale P allocates two buffers (a send buffer and a receive buffer). The send buffer includes the elements that locale P sends to each other locale P' based on the intersection set computed in step 2. 5) Each locale collectively calls an all-to-all exchange function. The receive buffer on each locale is then populated with the elements of B local to it, but in a permuted order. 6) The elements in the receive buffer are scattered on each locale, based on the receive intersection set computed in set 3.

An alternate approach to the above method may interleave steps 2-6 as follows: once the send intersection set is computed on a given locale (e.g. in step 2), P to another locale P', the method would pack that data into a receive buffer (step 3), and post an asynchronous send of that data to P'. Similarly, the method would post an asynchronous receive of the data from each process. When an asynchronous receive message is posted, the method computes the receive intersection set (step 3) pairwise and unpacks the data into B.

Data arrays are often used to store various forms of information. These different informational elements may be stored in arrays of varying dimensions. The individual elements of a multi-dimensional dense array are normally stored in consecutive locations in memory. When an array is composed of elements of a primitive type such as boolean, character, integer or floating point values, the consecutive locations, in turn, constitute a contiguous chunk of memory.

$$A = \begin{bmatrix} a_{(0,0)} & a_{(0,1)} & a_{(0,2)} & a_{(0,3)} \\ a_{(1,0)} & a_{(1,1)} & a_{(1,2)} & a_{(1,3)} \\ a_{(2,0)} & a_{(2,1)} & a_{(2,2)} & a_{(2,3)} \\ a_{(3,0)} & a_{(3,1)} & a_{(3,2)} & a_{(3,3)} \end{bmatrix}$$

The elements of array A can be laid out linearly in a contiguous block of memory in two ways: 1) one in which elements of the first index are in adjacent locations (the column-major or Fortran order) and 2) one in which the elements of the last index are in adjacent locations (the row-major or C order). These look respectively as follows:

$$A_{columnmajor} = [a_{(0,0)} a_{(1,0)} \cdots a_{(2,3)} a_{(3,3)}]$$

$$A_{rowmajor} = [a_{(0,0)} a_{(1,0)} \cdots a_{(3,2)} a_{(3,3)}]$$

In some embodiments, flat (A) may denote the one-dimensional array containing the elements of A as they are laid out in memory (note that the flat operator satisfies flat (flat (A))=flat (A)). In the description below, one may assume that multi-dimensional arrays are stored in column-major order, although the methods described herein apply equally well to arrays stored in row-major order.

For a n-dimensional matrix A of dimensions $M_0 \times M_1 \times \ldots M_{n-1}$, the coordinate $(i_0, i_1, \ldots, i_{n-1})$ corresponds to the location $$i = \sum_{d=0}^{n-1} \tilde{M}_d i_d$$

in flat(A). In (2) the strides $\tilde{M}_d$, d=0 ... n-1 are defined as: $\tilde{M}_0 = 1$ and $\tilde{M}_d = \tilde{M}_{d-1} \times M_{d-1}$.

The reshape operator may be used in reshaping a data array, where A is a $n^A$-dimensional matrix of dimensions $M_0^A \times M_1^A \times \ldots M_{nA-1}^A$ and let B be a $n^B$-dimensional matrix of dimensions $M_0^B \times M_0^B \times \ldots M_{nB-1}^B$ such that $$\prod_{d=0}^{nA-1} M_d^A = \prod_{d=0}^{nB-1} M_d^B$$

Then, B is a reshaped version of A if flat(A) =flat (B), (i.e., if both A and B have the same in-memory representation). This is illustrated below for a 4×4 and a 8×2 array:

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix} \quad B = \begin{bmatrix} a_0 & a_8 \\ a_1 & a_9 \\ a_2 & a_{10} \\ a_3 & a_{11} \\ a_4 & a_{12} \\ a_5 & a_{13} \\ a_6 & a_{14} \\ a_7 & a_{15} \end{bmatrix}$$

and is represented herein as B =reshape (A, $[M_0^B, M_1^B, \ldots, M_{nB-1}^B]$).

An array A is said to be distributed among P locales if each locale p ∈ {0, 1, ..., P-1} contains a portion of A local to it. It may be assumed, at least in this embodiment, that arrays are distributed along a single dimension d with each locale p getting a contiguous block (e.g. block 131) of the array along that dimension. Let local (A, p) denote the local portion of A on locale P. The local portions are themselves stored on each locale in a linear, contiguous block of memory in either row or column major order.

The intersection between two span objects $[S_i, E_i]$ and $[S_j, E_j]$ is given by $$[S_i, E_i] \cap [S_j, E_j] = \begin{cases} [\max(S_i, S_j), \min(E_i, E_j)] & \text{if } \min(E_i, E_j) \geq \max(S_i, S_j) \\ \phi & \text{otherwise} \end{cases}$$

A variable D may be used to represent the length of the distributed array A along the distributed dimension, d. The partitioning of the data in A essentially amounts to describing the partitioning of the span [0, D-1] between the P locales. The spans $[S_0, E_0], [S_1, E_1], \ldots, [S_{p-1}, E_{p-1}]$ must satisfy the following four consistency constraints:

1. Monotonicity: For non-empty spans, $E_i \geq S_i$

2. Covering property A:

$S_0 = 0$ unless D=0 in which case $[S_i, E_i] = \emptyset \; \forall i \in 0, 1, \ldots, P$.

3. Covering property B:

$S_{i+1} = E_i + 1$ for span on locales i and i+1 being non-empty.

4. Covering property C:

There exists a locale r s. t. $E_r = D-1$ and for any r'>r, $[S_{r'}, E_{r'}] = \emptyset$ Distributed arrays that satisfy only the above four constraints are termed range-partitioned arrays.

The block size and stride parameters for an 8×2-reshaped version of the same array when distributed in row and column fashion is illustrated below. The reshape algorithm computes the intersections between the gray blocks of FIG. 3A. One type of range-partitioned arrays are those that are considered "block partitioned". In block-partitioned arrays, the span [0, D-1] is first partitioned into a number of chunks with a minimum block size B. These chunks are in turn assigned in a regular fashion to the P locales such that each locale gets roughly an equal number of chunks. More precisely, for a block size B, the number of chunks, $N_{Chunks}$ is given as:

$$N_{Chunks} = \left\lceil \frac{D}{B} \right\rceil$$

The maximum number of chunks $N_{ChunksMax}$ that can be assigned to a given locale is:

$$N_{ChunksMax} = \left\lceil \frac{N_{Chunks}}{P} \right\rceil$$

Data chunks or blocks are "left over" if $$\mathrm{mod}(N_{Chunks}, N_{ChunksMax}) > 0$$

or if $$\mathrm{mod}(N_{Chunks}, N_{ChunksMax}) = 0 \text{ and } N_{Chunks} \times B > D$$

Having "left-over" chunks implies that some locales get less than $N_{Chunks} \times B$ data blocks along the distributed dimension.

$$P_{Max} = \begin{cases} \left\lfloor \frac{N_{Chunks}}{N_{ChunksMax}} \right\rfloor & \text{if there are no left-over chunks} \\ \left\lfloor \frac{N_{Chunks}}{N_{ChunksMax}} \right\rfloor - 1 & \text{if there are no left-over chunks} \end{cases}$$

The local span on a locale I can be computed using the following formula:

$$[S_i, E_i] = \begin{cases} [i \times N_{ChunksMax} \times B, (i+1) \times N_{ChunksMax} \times B] & \text{if } i < P_{Max} \\ [i \times N_{ChunksMax} \times B, D-1] & \text{if } i = P_{Max} \\ \phi & \text{if } i > P_{Max} \end{cases}$$

In one embodiment, a matrix/array A with the following elements will be analyzed:

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix}$$

If A is block distributed (with B=1) among two locales by columns, the local portions will look as follows:

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix} \quad \mathrm{local}(A, 0) = \begin{bmatrix} a_0 & a_4 \\ a_1 & a_5 \\ a_2 & a_6 \\ a_3 & a_7 \end{bmatrix}$$

$$\mathrm{local}(A, 1) = \begin{bmatrix} a_8 & a_{12} \\ a_9 & a_{13} \\ a_{10} & a_{14} \\ a_{11} & a_{15} \end{bmatrix}$$

Similarly, when A is block partitioned by rows between two locales, the local portions of A on each locale can be represented as shown below:

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix} \quad \begin{aligned} \mathrm{local}(A, 0) &= \begin{bmatrix} a_0 & a_4 & a_8 & a_{12} \\ a_1 & a_5 & a_9 & a_{13} \end{bmatrix} \\ \mathrm{local}(A, 1) &= \begin{bmatrix} a_2 & a_6 & a_{10} & a_{14} \\ a_3 & a_7 & a_{11} & a_{15} \end{bmatrix} \end{aligned}$$

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix} \quad \begin{aligned} \mathrm{local}(A, 0) &= \begin{bmatrix} a_0 & a_4 & a_8 & a_{12} \end{bmatrix} \\ \mathrm{local}(A, 1) &= \begin{bmatrix} a_1 & a_5 & a_9 & a_{13} \\ a_2 & a_6 & a_{10} & a_{14} \\ a_3 & a_7 & a_{11} & a_{15} \end{bmatrix} \end{aligned}$$

and the corresponding partitioning by columns looks like:

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix} \quad \begin{aligned} \mathrm{local}(A, 0) &= \begin{bmatrix} a_0 \\ a_1 \\ a_2 \\ a_3 \end{bmatrix} \\ \mathrm{local}(A, 1) &= \begin{bmatrix} a_4 & a_8 & a_{12} \\ a_5 & a_9 & a_{13} \\ a_6 & a_{10} & a_{14} \\ a_7 & a_{11} & a_{15} \end{bmatrix} \end{aligned}$$

In the description below, one may assume that unless otherwise specified, arrays are block partitioned with a block size B=1. As in the non-distributed case, a flatten operator may be implemented when working with distributed arrays. The flatten operator for a distributed matrix A creates a unit block-partitioned one-dimensional vector containing the elements of A stored in the same order as if A were not distributed at all. The flatten operator is therefore independent of the distribution of A and only depends up to its dimensions. This is shown below for both the row and column distributed versions of a 4×4 matrix:

$$A = \begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix} = \underbrace{\begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix}}_{\text{Column distributed}} \text{ or } \underbrace{\begin{bmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{bmatrix}}_{\text{Row distributed}}$$

$$\mathrm{flat}(A) = \begin{bmatrix} \underbrace{a_0 \ a_1 \ \ldots \ a_7}_{\text{Locale 0}} \mid \underbrace{a_8 \ a_9 \ \ldots \ a_{15}}_{\text{Locale 0}} \end{bmatrix}$$

Note that in general for an array A and locale P, flat(local(A, P)) ≠ local(flat(A), P).

A distributed array B may thus be defined to be a reshaped version of another distributed array A if flat(A)=flat(B). For example, if B=reshape(A, [8, 2]) for the matrix A shown above, we have $$B = \begin{bmatrix} a_0 & a_8 \\ a_1 & a_8 \\ a_2 & a_{10} \\ a_3 & a_{11} \\ a_4 & a_{12} \\ a_5 & a_{13} \\ a_6 & a_{14} \\ a_7 & a_{15} \end{bmatrix} = \begin{bmatrix} a_0 & a_8 \\ a_1 & a_8 \\ a_2 & a_{10} \\ a_3 & a_{11} \\ a_4 & a_{12} \\ a_5 & a_{13} \\ a_6 & a_{14} \\ a_7 & a_{15} \end{bmatrix} \text{ or } \begin{bmatrix} a_0 & a_8 \\ a_1 & a_8 \\ a_2 & a_{10} \\ \hline a_3 & a_{11} \\ \hline a_4 & a_{12} \\ a_5 & a_{13} \\ a_6 & a_{14} \\ a_7 & a_{15} \end{bmatrix}$$

Column distributed    Row distributed

These concepts will be explained further below with regard to method 200 of FIG. 2 and the example arrays of FIGS. 3A, 3B, 4A and 4B.

Figure 2:
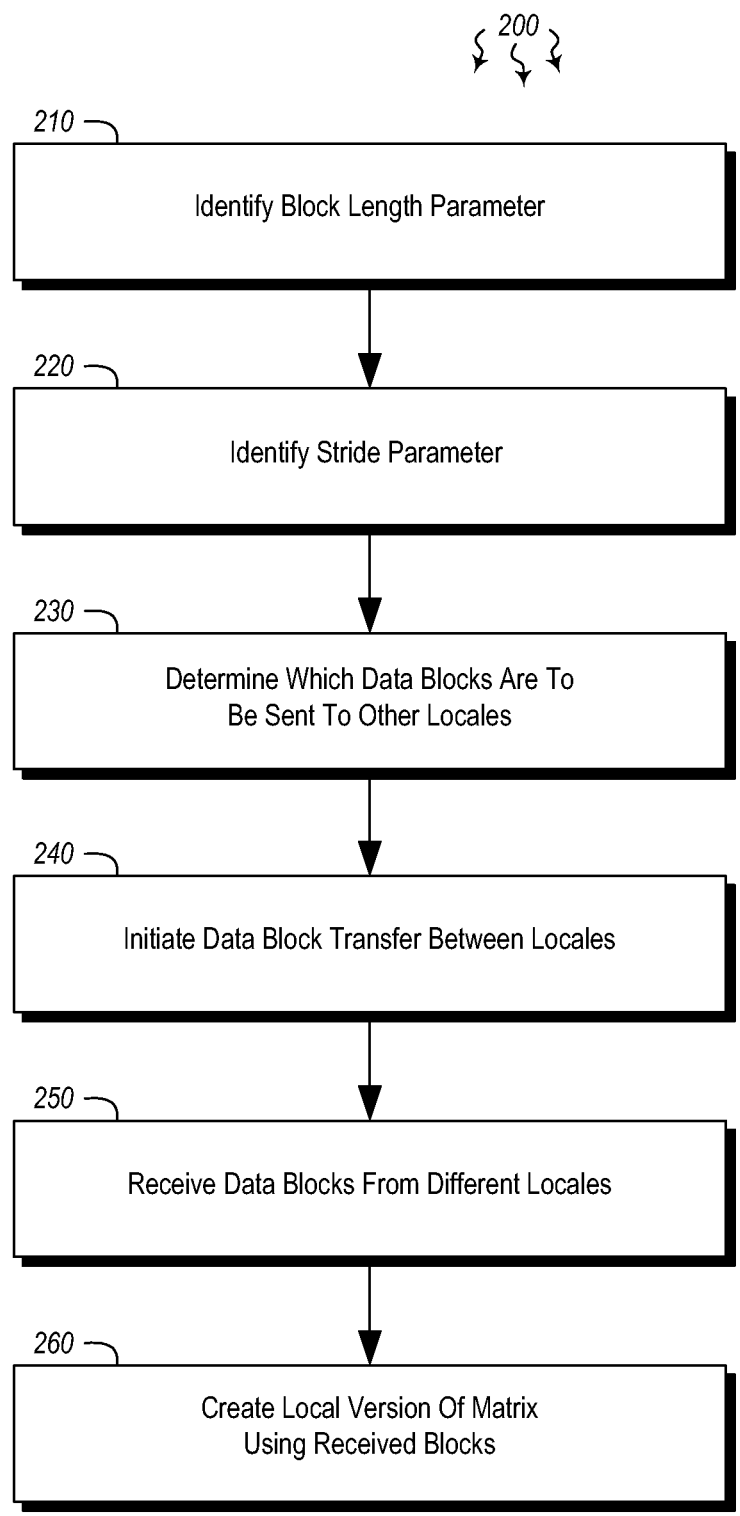
FIG. 2 illustrates a flowchart of an example method for reshaping an array from a range-partitioned flattened representation to a local, reshaped representation of the array.

In view of the systems and architectures described above, methodologies that may be implemented in accordance with the disclosed subject matter will be better appreciated with reference to the flow charts of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for reshaping an array from a range-partitioned flattened representation to a local, reshaped representation of the array, where different portions of the array are stored in different locales of a distributed system. The method 200 will now be described with frequent reference to the components and data of environment 100 of FIG. 1, as well as the example arrays of FIGS. 3A, 3B, 4A and 4B.

Figure 3A:
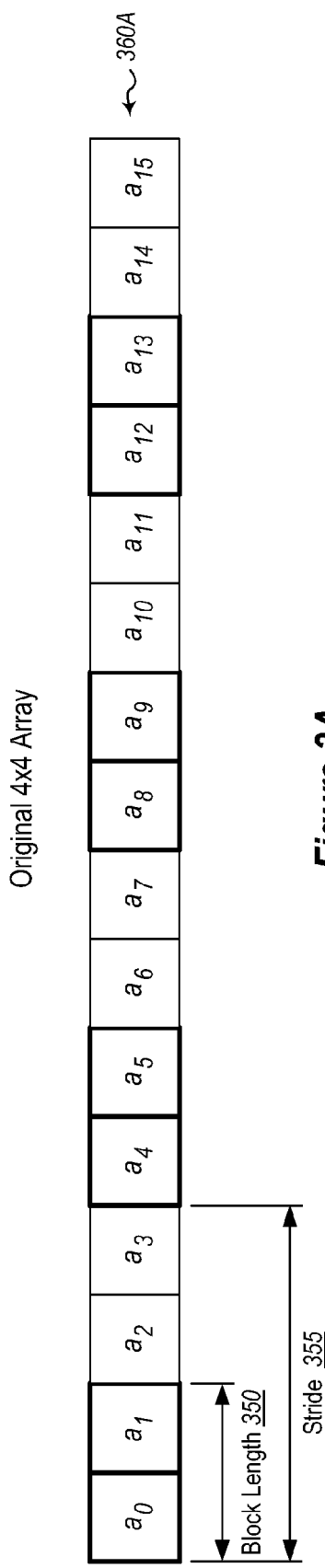
FIGS. 3A and 3B illustrate length parameters and stride parameters in example arrays.

Method 200 includes an act of identifying a block length parameter that describes the number of data blocks in the range-partitioned flattened representation of the array that appear consecutively in each locale (act 210). For example, local computer system 110 may identify block length parameter 111. As shown in FIG. 3A, the block length parameter describes the number of data blocks (e.g. a0-a15) in the range-partitioned flattened representation of the array 360A that appear consecutively in each locale (e.g. locale 130A). For instance, in array 360A, data blocks a0 and a1 are stored on one locale, while data blocks a2 and a3 are stored on another locale. Indeed, at least in FIGS. 3 and 4, data blocks with dark outlines are stored on one locale (e.g. 130A) and data blocks with a lighter outline are stored on a different locale (e.g. 130B). Because in FIG. 3A the largest consecutive number of blocks stored in a locale is two, the block length for array 360 is two. As shown below in FIG. 3B, the largest consecutive number of blocks stored in a locale is eight. Thus, the block length parameter for array 360B is eight.

As mentioned above, the array (e.g. 360A) is stored in memory in sequential memory blocks. It may be stored in one of the following manners: row by row, left to right or column by column, top to bottom. That is, in memory, each data value of an array is stored sequentially row by row, left to right or column by column, top to bottom. The range-partitioned flattened representation of the array may be partitioned over a first and a second locale (e.g. locales 130A and 130B). (It will be understood that the array may be partitioned over substantially any number of locales). The first locale (130A) may store a subset of rows of data blocks 131 in the range-partitioned flattened representation of the array. The second locale (130B) may then store the remainder of the data block rows in the range-partitioned flattened representation of the array.

In other embodiments, the first locale (130A) stores a subset of columns of data blocks in the range-partitioned flattened representation of the array. The second locale (130B) stores the remainder of the data block columns in the range-partitioned flattened representation of the array. The range-partitioned flattened representation of the array may be partitioned onto the plurality of locales over a single dimension or over multiple dimensions. In some cases, the computer system may ensure that no rows or columns overlap to ensure a consistent view between locales (i.e. no data blocks are stored in more than one locale (which could create an overlap)). In cases where two or more locales update the same data block in the distributed representation of the array, an algorithm may be implemented that uses the first received update. This may resolve any conflicting updates that are received for the same data block.

Returning to FIG. 2, method 200 includes an act of identifying a stride parameter that describes the amount of separation between data blocks in the range-partitioned flattened representation of the array that appear consecutively in a plurality of locales (act 220). For example, local computer system 110 may identify stride parameter 112 which describes the combined number of data blocks in the range-partitioned flattened representation of the array 360A that appear consecutively in locale 130A and locale 130B. Thus, in array 360A, the stride parameter would be four blocks long, while the stride parameter in array 360B would be eight data blocks long. The range-partitioned flattened representation of the array (e.g. 360A) may be indexed. The index indicates which data blocks are stored on which locales. A mapping component may also be used which maps the array data values to memory values and stores the data value locations as header data, or as some other type of metadata.

Based on the identified block length parameter and the stride parameter, data location determining module 115 of local computer system may determine which of the data blocks 131 among the locales are to be sent to one or more other locales to produce a reshaped local version of the array (act 230). For example, if the array is distributed over multiple locales and data from the various locales is to be gathered to create a local version, the data location determining module 115 (on any of the locales, and/or on the local computer system) may determine where each of the desired data is stored. In one example, the data is distributed over locales 130A and 130B. Locale 130A may store a subset of rows of data blocks in the range-partitioned flattened representation of the array and locale 130B may store the remainder of the data block rows in the range-partitioned flattened representation of the array. In a different embodiment, locale 130A may store a subset of columns of data blocks in the range-partitioned flattened representation of the array and locale 130B may store the remainder of the data block columns in the range-partitioned flattened representation of the array.

After the data block locations are known, the local computer system 110 and/or each separate locale may initiate a data block transfer between the data blocks of the various locales (act 240). For example, as shown in FIG. 1, data blocks 131 may be transferred between the receiving modules of the different locales, and also to the data receiving module 120 of the local computer system. In some cases, the data blocks to be sent between locales 130A and 130B may those data blocks that intersect one another in the data storage.

Figure 3B:
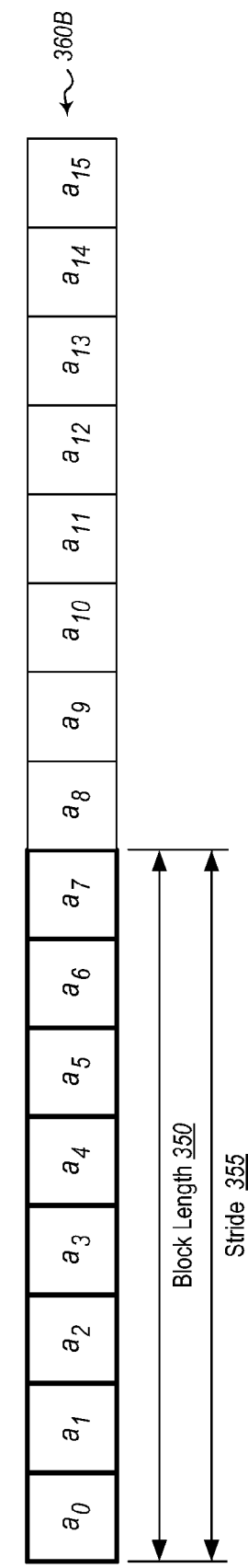
Figure 4A:
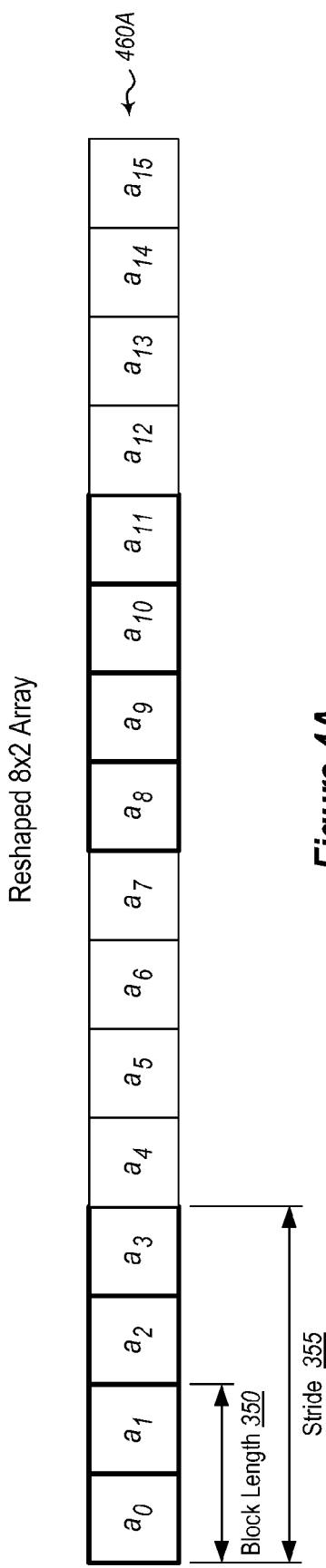
FIGS. 4A and 4B illustrate length parameters and stride parameters in an alternative example array.
Figure 4B:
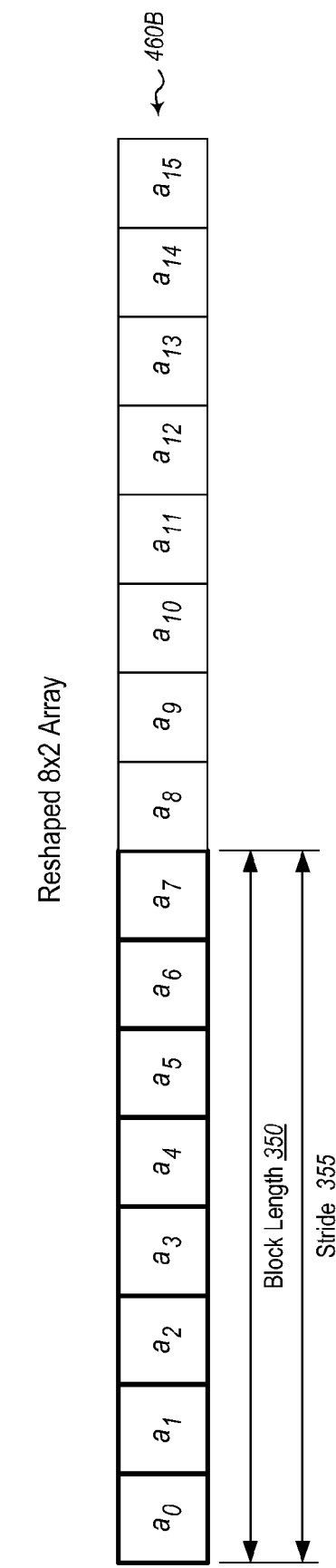

For instance, as shown in FIGS. 3A, 3B, 4A and 4B, the darker-outlined boxes may indicate the elements on locale 130A, while the lighter-outlined boxes show the elements on locale 130B. The block length and strides for a 4×4 array distributed in a block fashion between two locales is shown in FIGS. 3A and 3B. FIGS. 3A and 3B show arrays 360A and 360B where the arrays are distributed by rows. FIGS. 4A and 4B show arrays 460A and 40B where the arrays are reshaped, and are distributed by columns. Thus, FIGS. 4A and 4B show the block size and stride parameters for an 8×2-reshaped version of the same array when distributed in row fashion (FIG. 4A) and in column fashion (FIG. 4B). When reshaping, the computer system computes the intersections between the lighter-outlined boxes and the darker-outlined boxes (e.g. in FIGS. 3A and 4A, and between FIGS. 3B and 4B) depending on the initial and final distribution. The computer system then schedules all-to-all communication based on the intersecting boxes on each rank.

In some embodiments, the computer system may determine how to transfer the data between the plurality of locales with the least number of data fetches. Thus, each locale can receive the necessary data while consuming the least amount of network bandwidth. In some cases, the local computer system 110 may access a data cache on each locale when determining which data to send from the first locale to the second locale and from the second locale to the first locale. The data blocks may then be transferred without referring to a data transfer schedule.

Data receiving module 120 may receive one or more data blocks from the plurality of locales in the distributed system (act 250). Using the received data blocks, the array reconstructing module 125 may reconstruct the array based on the received blocks, such that a reshaped local version of the array is created (act 260). Once reconstructed, the local reshaped array 126 is available for local processing operations. The local computer system may further determine how to optimally perform local operations on the local reshaped array. As such, the reshaped local array may be accessed and used in cases where the array is initially too large for a single system and has been distributed to multiple systems. The reshaped local array 126 can be presented to the user for further operations, while maintaining the data blocks in the same locations in memory.

Accordingly, methods, systems and computer program products are provided which reshape an array from a range-partitioned flattened representation to a local, reshaped representation of the array, where different portions of the array are stored in different locales of a distributed system.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A computer-implemented method of reshaping a distributed data array that has data blocks distributed among a plurality of locales of a distributed system in order to form a reshaped local version of said data array in which at least some of the data blocks have been redistributed among the locales of the distributed system the computer-implemented method comprising acts of:
    identifying a data array having a plurality of data blocks distributed and stored at a plurality of locales;
    generating for said data array a range-partitioned flattened representation of said data array which represents how data blocks of said data array are partitioned over a first locale and at least one other locale and how the partitioned data blocks intersect at said first and said at least one other locale;
    identifying for said data array a block length parameter that describes the largest number of data blocks in the range-partitioned flattened representation of said data array that appear consecutively in each locale;
    identifying a stride parameter that describes the amount of separation between data blocks based on said identified block length parameter in the range-partitioned flattened representation of said data array;
    based on the identified block length parameter and the identified stride parameter, determining for the range-partitioned flattened representation of said data array one or more intersections between data blocks stored on said first locale and data blocks stored on said at least one other locale;
    based on the one or more intersections, identifying which of the data blocks are to be transferred from the first locale to the at least one other locale and which of the data blocks are to be transferred from the at least one other locale to the first locale to produce a reshaped local version of said data array; and
    producing said reshaped local version of said data array by transferring the data blocks identified for transfer between the first and the at least one other locale.

2. The method of claim 1, wherein a mapping component maps array data values to memory values and stores mapped data value memory locations as header data.

3. The method of claim 2, wherein first locale stores a subset of rows of data blocks in the range-partitioned flattened representation of the array and the at least one other locale stores the remainder of the data block rows in the range-partitioned flattened representation of the array.

4. The method of claim 2, wherein the first locale stores a subset of columns of data blocks in the range-partitioned flattened representation of the array and the at least one other locale stores the remainder of the data block columns in the range-partitioned flattened representation of the array.

5. The method of claim 2, wherein the data blocks to be sent between the first locale and at least one other locale intersect one another.

6. The method of claim 1, wherein the reshaped local version of said data array is available for local processing operations.

7. The method of claim 1, further comprising an act of determining how to transfer data blocks between the first locale and at least one other locale with the least number of data fetches.

8. The method of claim 2, further comprising accessing data cached on each locale when determining which data blocks to send from the first locale to the at least one other locale and from the at least one other locale to the first locale.

9. The method of claim 1, wherein the data blocks are transferred without referring to a data transfer schedule.

10. The method of claim 1, wherein the range-partitioned flattened representation of the data array is partitioned onto the plurality of locales over a single dimension.

11. The method of claim 1, wherein the range-partitioned flattened representation of the data array is partitioned onto the plurality of locales over multiple dimensions.

12. The method of claim 1, wherein no rows or columns of the range-partitioned flattened representation overlap to ensure a consistent view between locales.

13. The method of claim 1, wherein if two or more locales update the same data block in the distributed data array, an algorithm is implemented that uses the first received update.

14. The method of claim 1, further comprising an act of indexing the range-partitioned flattened representation of the data array to indicate which data blocks are stored on which locales.

15. The method of claim 1, wherein the data array is stored in memory in sequential memory blocks in at least one of the following manners: i) row by row, left to right and ii) column by column, top to bottom.

16. A computer program product for implementing a method for reshaping a distributed data array that has data blocks distributed among a plurality of locales of a distributed system in order to form a reshaped local version of said data array in which at least some of the data blocks have been redistributed among the locales of the distributed system, the computer program product comprising one or more computer-readable storage devices having stored thereon computer-executable instructions that, when executed by one or more processors of the computing system, cause the computing system to perform the method, which is comprised of the following acts:
   identifying a data array having a plurality of data blocks distributed and stored at a plurality of locales;
   generating for said data array a range-partitioned flattened representation of said data array which represents how data blocks of said data array are partitioned over a first locale and at least one other locale and how the partitioned data blocks intersect at said first and said at least one other locale;
   identifying for said data array a block length parameter that describes the largest number of data blocks in the range-partitioned flattened representation of said data array that appear consecutively in each locale;
   identifying a stride parameter that describes the amount of separation between data blocks based on said identified block length parameter in the range-partitioned flattened representation of said data array;
   based on the identified block length parameter and the identified stride parameter, determining for the range-partitioned flattened representation of said data array one or more intersections between data blocks stored on said first locale and data blocks stored on said at least one other locale;
   based on the one or more intersections, identifying which of the data blocks are to be transferred from the first locale to the at least one other locale and which of the data blocks are to be transferred from the at least one other locale to the first locale to produce a reshaped local version of said data array;
   determining the least number of data fetches required to implement transfer of the data blocks identified for transfer;
   using the least number of fetches determined to be required, transferring the data blocks identified for transfer between the first and the at least one other locale;
   receiving the data blocks of said data array from the plurality of locales in the distributed system;
   reconstructing the data array based on the received blocks to create a reshaped local version of the data array; and
   performing one or more local processing operations on the reshaped local version of the data array.

17. The computer program product of claim 16, wherein the reshaped local version of the data array maintains the data blocks in the same locations in memory.

18. The computer program product of claim 16, wherein a mapping component maps the array data values to memory values and stores mapped data value memory locations as header data.

19. The computer program product of claim 16, further comprising an act of determining how to optimally perform local operations on the reshaped local version of the data array.

20. A computer system comprising:
   one or more processors;
   system memory;
   one or more computer-readable storage devices having stored thereon computer-executable instructions that, when executed by the one or more processors, causes the computing system to perform a method for reshaping a distributed data array that has data blocks distributed among a plurality of locales of a distributed system in order to form a reshaped local version of said data array in which at least some of the data blocks have been redistributed among the locales of the distributed system, the method comprising acts of:
      identifying a data array having a plurality of data blocks distributed and stored at a plurality of locales;
      generating for said data array a range-partitioned flattened representation of said data array which represents how data blocks of said data array are partitioned over a first locale and at least one other locale and how the partitioned data blocks intersect at said first and said at least one other locale;
   identifying for said data array a block length parameter that describes the largest number of data blocks in the range-partitioned flattened representation of said data array that appear consecutively in each locale;
      identifying a stride parameter that describes the amount of separation between data blocks based on said identified block length parameter in the range-partitioned flattened representation of said data array;
      based on the identified block length parameter and the identified stride parameter, determining for the range-partitioned flattened representation of said data array one or more intersections between data blocks stored on said first locale and data blocks stored on said at least one other locale;
      based on the one or more intersections, identifying which of the data blocks are to be transferred from the first locale to the at least one other locale and which of the data blocks are to be transferred from the at least one other locale to the first locale to produce a reshaped local version of said data array;
      determining the least number of data fetches required to implement transfer of the data blocks identified for transfer;
      using the least number of fetches determined to be required, transferring the data blocks identified for transfer between the first and the at least one other locale;
      receiving the data blocks of said data array from the plurality of locales in the distributed system;
      reconstructing the data array based on the received blocks to create a reshaped local version of the data array; and
      performing one or more local processing operations on the reshaped local version of the data array.

* * * * *